United States Patent

[11] 3,610,275

| [72] | Inventors | Thomas E. Determan<br>7301 Norman Road, Oklahoma City, Okla. 73132;<br>David M. Scheirman, 3305 Windsor Blvd., Oklahoma City, Okla. 73122 |
|---|---|---|
| [21] | Appl. No. | 34,040 |
| [22] | Filed | May 4, 1970 |
| [45] | Patented | Oct. 5, 1971 |

[54] REMOVABLE DRAIN VALVE
7 Claims, 3 Drawing Figs.

[52] U.S. Cl. .................................................... 137/430, 137/533.11
[51] Int. Cl. ........................................................ F16k 31/18
[50] Field of Search ................................ 137/247.13–247.23, 315, 409, 411, 426, 429, 430, 433, 454.2, 519.5, 533.11

[56] References Cited
UNITED STATES PATENTS

| 859,540 | 7/1907 | Bonnell | 137/433 |
| 1,176,785 | 3/1916 | Stielow | 137/433 X |
| 1,753,724 | 4/1930 | Shaw | 137/454.3 X |
| 3,007,484 | 11/1961 | Hallinan | 137/430 X |

Primary Examiner—M. Cary Nelson
Assistant Examiner—David R. Matthews
Attorney—Dunlap, Laney, Hessin & Dougherty ABSTRACT: Apparatus for insertion in a drain pipe which allows liquid downflow while preventing evaporation of trap water therebelow as well as gaseous seep which may subsequently follow. The apparatus consists of first and second cylindrical body portions which are extensibly affixed together and separated by a resilient gasket that expands outwardly to grip a drain pipe, within which the device is inserted, when the first and second cylindrical body portions are drawn together as by externally accessible screw fasteners or the like. The lower cylindrical body includes a float ball and upper and lower valve seating collars for coaction to close off passage of air or water during backflow or no-flow conditions.

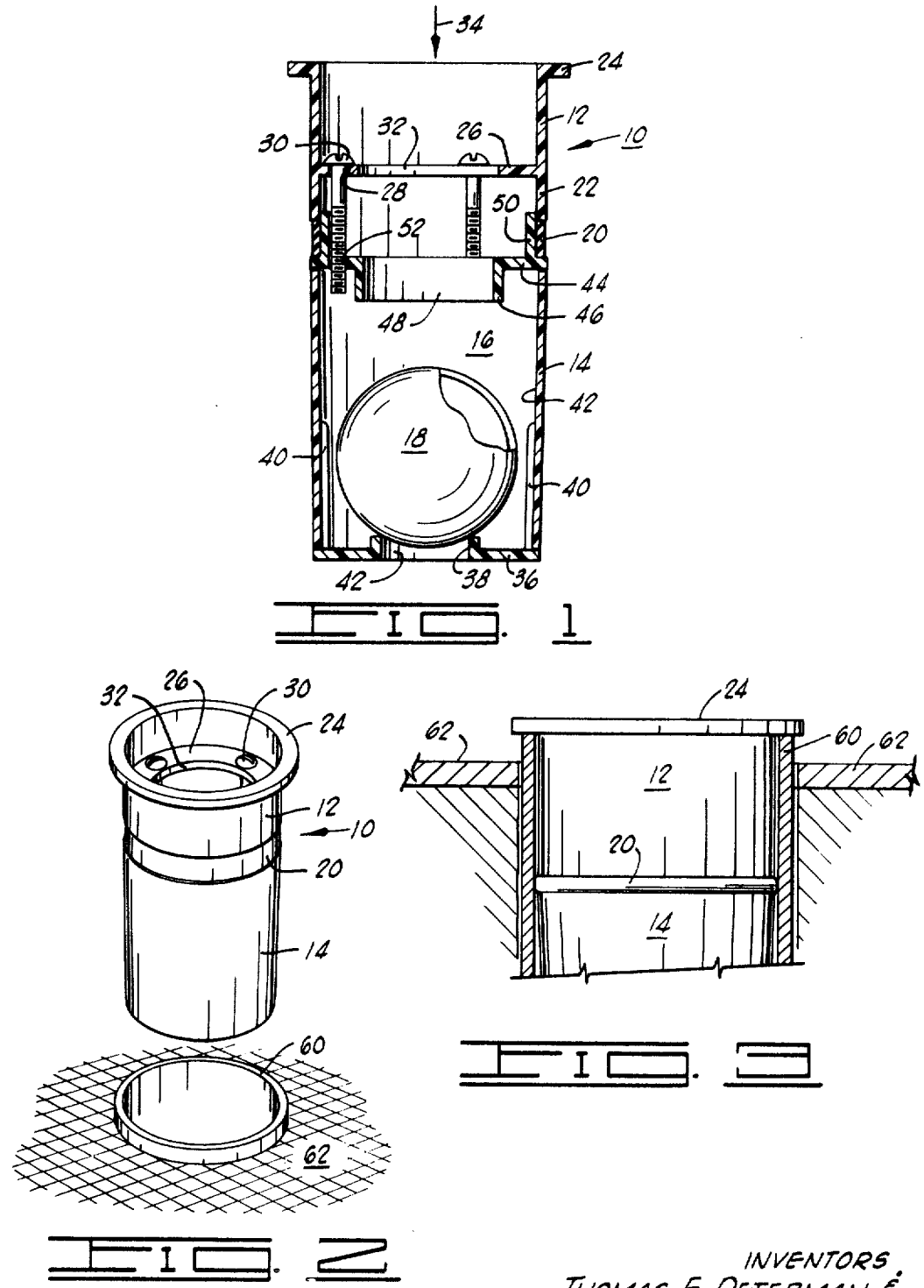

REMOVABLE DRAIN VALVE

BACKGROUND OF THE INVENTION

1. Field of the Invention

The invention relates generally to drain valving devices and, more particularly, but not by way of limitation, it relates to improved float-type check valves which are removably insertable for use in drainpipes utilizing water traps.

2. Description of the Prior Art

The prior art includes diverse types of ball-type valving devices utilized for providing necessary valving actions in drainpipe assemblies. Various forms of the prior device utilize a float ball in coaction with a suitable seating chamber for the purpose of trapping sewer gas or other unpleasant emissions, and some forms even make provision for positive blockage of backup waterflow as may occur during certain flush operations of clogged drain systems. All of the known prior systems require permanent installation of a structure characteristically formed to function as the flotation valve chamber and to include the necessary float ball and valve seating structures. The general teachings of such prior art structures are probably best exemplified by U.S. Pat. No. 1,878,946 in the name of Luff et al. Such systems are primarily concerned with preventing backflow of liquid and they utilize a float unit which does not seat for sealing evaporation until after the evaporation of a considerable amount of the trap water below.

SUMMARY OF THE INVENTION

The present invention contemplates a float-type check valve assembly which is removably insertable within standard diameter drainpipe or soil pipe as stubbed up into an interior space. In a more limited aspect, the removable valve assembly consists of upper and lower cylindrical components axially movable each to the other and separated by a resilient gasket material which is expanded circularly outward upon axial closure of the upper and lower components. The lower component of the assembly forms a chamber which includes upper and lower seating collars and a float ball disposed for free movement therein in response to waterflow, the float ball being adapted to close off the lower valve seating collar in the no-flow condition to prevent evaporation from water traps below as well as gaseous seep which may subsequently occur.

Therefore, it is an object of the present invention to provide a drain valve assembly which is capable of preventing water backflow, trap water evaporation and sewer gas seepage while still allowing free drainage function as necessary.

It is also an object of the invention to provide a drain valve assembly which is removably insertable within standard size drain piping.

It is yet another object of the invention to provide a drain valve assembly which can be removed from its operative position for cleaning, inspection or testing, and repair.

Finally, it is an object of the present invention to provide a ball-type drain valve assembly which rests at a closed position in its no-flow condition to form a barrier against gas or vapor in nonpressurized conditions while still serving to check backflow of flush water as needed.

Other objects and advantages of the invention will be evident from the following detailed description when read in conjunction with the accompanying drawing which illustrates the invention.

BRIEF DESCRIPTION OF THE DRAWING

FIG. 1 is a vertical cross section of a drain valve assembly constructed in accordance with the present invention;

FIG. 2 is a functional illustration in perspective showing a drain valve assembly in position prior to insertion for seating in a drainpipe or such; and FIG. 3 is a section with parts shown in elevation of the drain valve assembly in the installed attitude.

DETAILED DESCRIPTION OF THE PREFERRED EMBODIMENT

As shown in FIG. 1, a drain valve assembly 10 consists of an upper cylindrical portion 12 and a lower cylindrical portion 14 which are aligned in axial relationship. The lower cylindrical portion 14 defines a valve chamber 16 which includes a hollow float ball 18 in freely movable disposition therein. The upper and lower cylindrical chambers 12 and 14 are separated by a resilient gasket 20 which is expanded outward in installation, as will be further described below, to provide a concentric seal with a surrounding drainpipe or such other receptacle.

The upper cylindrical portion 12 is formed to have an open cylindrical end 22 and an upper circularly flanged end 24 which may be variously formed for both the retention and decoration attributes. An annular ring 26 is then formed transverse to upper cylindrical section 12 at about its axial midpoint. Annular ring 26 is formed to include a plurality of equispaced holes 28, e.g. three holes, for receiving each of fasteners 30 downward therethrough. The inner diameter 32 of annular ring 26 defines a circular passage through which drain water flows in the direction of arrow 34.

The lower cylindrical section 14 is formed with an annular bottom plate 36 which includes an upwardly extending seating collar 38 formed about its inner diameter. The seating collar 38 receives the float ball 18 thereon in sealing disposition and a plurality of equispaced guide ribs 40 are formed about the lower portion of the inside wall 42 of lower cylindrical section 14. The guide ribs 40 provide general centering of float ball 18 with minimal restriction of drainage flow therearound to flow out of a drainage orifice 42 as defined by the inner circular surface of lower seating collar 38.

The upper end of lower cylindrical section 14 is formed to have an annular plate 44 which includes a centrally aligned, downwardly turned flange which forms an upper seating collar 46 defining an upper orifice 48 therethrough. A circular collar 50 is formed concentrically about the upper surface of annular plate 44. The diameter of collar 50 is formed to be such that collar 50 moves axially in slidable but noninterfering contact within the lower end 22 of upper cylindrical section 12. The resilient gasket 20, as formed from rubber, neoprene, plastic, or such materials, is the inserted around collar 50 and in axial alignment with the lower end 22 of upper cylindrical section 12. A plurality of aligned threaded holes 52 are then formed through annular plate 44 in alignment to receive each of threaded fasteners 30.

The individual components of the valve assembly 10 may be constructed from any of the various materials, e.g. plastics and/or selected metals, and it is probable that the parts will be formed by casting plastics exhibiting optimum corrosivity properties in such applications. Thus, upper cylindrical section 12 may be formed as a unitarily cast section including annular plate 26 and the upper flange 24. Similarly, the lower cylindrical section 14 may be cast unitarily to include bottom annular plate 36 and seating collar 38. The upper annular plate 44 including formed collar 50 and seating collar 46 may then be affixed after insertion of float ball 18.

OPERATION

The valve assembly 10 may be installed in any properly sized drain pipe extending into the floor of an interior space. The vale assemblies 10 can be constructed at various diameters to satisfy requirements for use in any of many different types of floor drain requirement. Thus, as shown in FIG. 2, the valve assembly 10 is easily fitted downward into an existing drainpipe 60 which is properly stubbed up through a floor 62. Upon insertion of valve assembly 10 downward in drainpipe 60, the plurality of fasteners 30 can then be tightened to cause flexure of resilient gasket 20 outward to grip the internal surface of drainpipe 60 as shown in FIG. 3. That is, tightening of fasteners 30 will draw lower cylindrical section 14 axially toward upper cylindrical section 12 such that the resilient gasket 20 is forced outward into tight sealing relationship with the closely fitting drainpipe inner surface. The valve assembly 10 is then installed for permanent usage, but it still retains the capability of being easily removable for cleaning, inspection of drainpipe maintenance access.

As is conventional practice, the drain valve assembly 12 is installed in drainpipe 60 just above a P-type trap which serves to hold water when the drain is not in use thereby to prevent sewer gases from moving out of the drainpipe into the interior space. Such sewer gas has a very offensive odor and, in the case of furnace and boiling room applications, it can pose a fire hazard with presence of certain sewage conditions.

Water from above drain valve assembly 10 is free to flow in the direction of arrow 34 (FIG. 1) downward through valve assembly 10 into the valve chamber 16 whereupon float ball 18 is floated to allow passage of the drain water therearound and out through the bottom drain hole, the drainage orifice 42 of valve seat collar 38. The inrush of drain water through orifice 48 of upper seat collar 46 will maintain the float ball 18 displaced therefrom while force of buoyancy of float ball 18 will maintain the ball sufficiently displaced upward from valve seating collar 38. The net effect is that flow ball 18 oscillates in an equilibrium midposition while drain water flows therearound and out of the bottom end of valve assembly 10.

When all of the drain water is released downward into the drainpipe 60 and into the subsequent P-type trap (not specifically shown), the float ball 18 is allowed to rest on the valve seat collar 38. In this position, the valve float ball 18 serves to prevent evaporation of the water from the P-type trap there below, this serving to preserve the ability to block sewer gas from the further parts of the drainage system. It has been found in some applications that the water from the P-type trap can evaporate quickly to remove the effective sewer gas block, but when using the valve assembly 10 only negligible water evaporation can take place and complete evacuation of the P-type trap is highly improbable. Even in the event of very long periods of no drain flow, where for some reason the water in the P-type trap did evaporate, the float ball 18 is still capable of blocking upward emission of sewer gases since such gases are under minimal or no pressure and will not force the seal of float ball 18.

The foregoing discloses a novel drainpipe assembly which is removably insertable within standard sizes of drainpipe. A valve assembly constructed in accordance with the invention serves to coact with water trap piping included in the drain system as it prevents evaporation of water from within the drainpipe to maintain the sealing integrity of the trap members. The valve assembly still retains the capability of full drainage capacity with respect to flow of drain water, and the assembly is capable of complete removal by easy manual manipulation of standard fasteners. The present invention enables more efficient valve assembly which can be constructed for any of various drainpipe sizes, easily and with great economy, to enable a highly reliable, long-lived unit.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A drain valve assembly for removable insertion within a drainpipe, comprising:

first cylindrical means having first and second ends with said first end partially closed by a first annular plate and a first collar means disposed around an inner diameter thereof, said second end being partially closed by a second annular plate having a second collar means disposed about an inner diameter thereof;

second cylindrical means disposed in axial alignment with said first cylindrical means;

resilient gasket means disposed between said first and second cylindrical means;

float ball means disposed within said first cylindrical means, said float ball means having a greater diameter than either of the inner diameters of said first and second annular plates; and fastener means for progressively drawing said first cylindrical means axially toward said second cylindrical means to expand said resilient gasket means radially outward to form an increasingly tighter seal against an inner surface of said drainpipe when said drain valve assembly is inserted therein.

2. A drain valve assembly as set forth in claim 1 wherein said fastener means comprises:

third annular plate means formed about an inner circumference of said second cylindrical means, said third annular means defining an orifice therethrough; and plural screw means disposed through said third annular means in equispaced relationship therebout, said screw means each being threadedly engaged through said second annular plate.

3. A drain valve assembly as set forth in claim 2 which is further characterized to include:

collar means of cylindrical shape secured about the upper surface of said second annular plate in concentric relationship to the outer diameter thereof, said collar means being disposed in contact with the inner cylindrical surface of said gasket means as well as in sliding contact with a portion of the inner cylindrical surface of said second cylindrical means.

4. A drain valve assembly as set forth in claim 1 which is further characterized to include:

collar means of cylindrical shape secured about the upper surface of said second annular plate in concentric relationship to the outer diameter thereof, said collar means being disposed in contact with the inner cylindrical surface of said gasket means as well as in sliding contact with a portion of the inner cylindrical surface of said second cylindrical means.

5. A drain valve assembly as set forth in claim 1 which is further characterized in that:

said float ball is a sealed hollow ball containing air and having an outside diameter which is approximately three-quarters the inside diameter of said first cylindrical means.

6. A drain valve assembly as set forth in claim 1 which is further characterized to include:

a plurality of guide rib means disposed equispaced and axially on the inside cylindrical surface of said first cylindrical means adjacent the first end thereof.

7. A drain valve assembly as set forth in claim 6 which is further characterized in that:

said float ball is a sealed hollow ball containing air and having an outside diameter which is approximately three-quarters the inside diameter of said first cylindrical means.